United States Patent
Golz et al.

(10) Patent No.: US 10,960,467 B2
(45) Date of Patent: Mar. 30, 2021

(54) FORMING DEVICE FOR PRODUCING MOULDED BODIES BY SELECTIVELY HARDENING POWDER MATERIAL

(71) Applicant: REALIZER GMBH, Borchen (DE)

(72) Inventors: Daniel Golz, Langenberg (DE); Matthias Fockele, Borchen (DE)

(73) Assignee: REALIZER GMBH, Borchen (DE)

( * ) Notice: Subject to any disclaimer, the term of this patent is extended or adjusted under 35 U.S.C. 154(b) by 0 days.

(21) Appl. No.: 15/776,950

(22) PCT Filed: Aug. 18, 2016

(86) PCT No.: PCT/EP2016/069613
§ 371 (c)(1),
(2) Date: May 17, 2018

(87) PCT Pub. No.: WO2017/084781
PCT Pub. Date: May 26, 2017

(65) Prior Publication Data
US 2019/0001413 A1    Jan. 3, 2019

(30) Foreign Application Priority Data
Nov. 17, 2015   (DE) .................... 10 2015 222 689.1

(51) Int. Cl.
*B33Y 30/00*        (2015.01)
*B33Y 40/00*        (2020.01)
(Continued)

(52) U.S. Cl.
CPC .......... *B22F 3/1055* (2013.01); *B29C 64/153* (2017.08); *B29C 64/35* (2017.08);
(Continued)

(58) Field of Classification Search
CPC .................................................. B29C 64/357
See application file for complete search history.

(56) References Cited

U.S. PATENT DOCUMENTS 5,653,346 A * 8/1997 Frei .................... B01D 33/0346
                                                  209/254
6,215,093 B1   4/2001 Meiners et al.
(Continued)

FOREIGN PATENT DOCUMENTS

CN         104741610        7/2015
DE          19905067        8/2000
(Continued)

OTHER PUBLICATIONS

Bin Master. "Reliable Level Measurement in High Dust." BinView® Deployment—Sensor, 2013, www.binmaster.com/_resources/dyn/files/1110551z1241bb00/_fn/3DLevelScannner_RL_Oct2013.pdf. (Year: 2013).*

(Continued)

*Primary Examiner* — Alison L Hindenlang
*Assistant Examiner* — Andrés E. Behrens, Jr.
(74) *Attorney, Agent, or Firm* — Kilpatrick Townsend & Stockton LLP (57) ABSTRACT

A forming device for producing moulded bodies by selectively hardening powder material to form connected regions, including a process chamber having a powder inlet and a powder outlet. A powder supply apparatus is connected to the powder inlet for providing powder material to the process chamber. A powder recovery apparatus is connected to the powder outlet for receiving and recycling excess powder material from the process chamber. The powder supply and powder recovery apparatuses form a subassembly designed as an interchangeable module. The interchangeable module includes input and output connection interfaces connection-compatible with connection interfaces of the powder inlet and powder outlet. Excess powder is fed from the process chamber through the powder outlet to the powder recovery apparatus via an input interface of the (Continued)

interchangeable module. Powder material prepared by the powder recovery apparatus is fed to the process chamber through the powder inlet via an output interface of the interchangeable module.

20 Claims, 3 Drawing Sheets (51) Int. Cl.
B29C 64/153 (2017.01)
B29C 64/35 (2017.01)
B29C 64/357 (2017.01)
B22F 3/105 (2006.01)

(52) U.S. Cl.
CPC ............ *B29C 64/357* (2017.08); *B33Y 30/00* (2014.12); *B33Y 40/00* (2014.12); *B22F 2003/1056* (2013.01); *B22F 2003/1059* (2013.01); *B22F 2999/00* (2013.01); *Y02P 10/20* (2015.11); *Y02P 10/25* (2015.11)

(56) References Cited

U.S. PATENT DOCUMENTS

| 2004/0012112 | A1* | 1/2004 | Davidson | B29C 41/12 |
| | | | | 264/109 |
| 2004/0045941 | A1 | 3/2004 | Herzog et al. | |
| 2015/0298397 | A1 | 10/2015 | Chen et al. | |
| 2015/0336330 | A1 | 11/2015 | Herzog | |
| 2019/0151954 | A1* | 5/2019 | Xiao | B22F 8/00 |
| 2019/0375157 | A1* | 12/2019 | Fockele | B33Y 40/00 |
| 2020/0307074 | A1* | 10/2020 | Tjellesen | B29C 64/153 |

FOREIGN PATENT DOCUMENTS

| DE | 10112591 | | 10/2001 | |
| DE | 10053741 | | 2/2002 | |
| DE | 202009000825 | | 3/2009 | |
| DE | 102009005769 | | 8/2010 | |
| DE | 102009029765 | | 12/2010 | |
| DE | 102009036153 | | 2/2011 | |
| DE | 102009038165 | | 2/2011 | |
| DE | 102012221641 | | 5/2014 | |
| DE | 102013000511 | | 7/2014 | |
| EP | 2052845 | | 4/2009 | |
| EP | 2862651 | A1 * | 4/2015 | ............ B22F 3/1055 |
| WO | WO-9208592 | A1 * | 5/1992 | ............ B29C 67/04 |
| WO | 9824574 | | 6/1998 | |

OTHER PUBLICATIONS

Finex, Russell. "Ultrasonic Sieve Deblinding." Ultrasonic Sieves | Vibrasonic Deblinding System | Russell Finex, web.archive.org/web/20151108111459/www.russellfinex.com/en/separation-equipment/ultrasonic-sieves/. (Year: 2015).*
German Application No. 10 2015 222 689.1 , German Search Report dated Oct. 28, 2016.
International Application No. PCT/EP2016/069613, International Search Report dated Feb. 23, 2017.
International Application No. PCT/EP2016/069613, International Written Opinion dated Feb. 23, 2017.

* cited by examiner

FORMING DEVICE FOR PRODUCING MOULDED BODIES BY SELECTIVELY HARDENING POWDER MATERIAL

The invention relates to a forming device for producing moulded bodies by selectively hardening powder material to form connected regions, comprising
- a process chamber having a powder inlet for powder material to be processed, and a powder outlet for excess powder material;
- a powder supply apparatus that is or can be connected to the powder inlet and is intended for providing powder material in the process chamber, and
- a powder recovery apparatus that is or can be connected to the powder outlet and is intended for recycling powder material to be processed out of the excess powder material.

The invention relates in particular to a forming device for producing moulded bodies according to the principle of selective laser melting or selective laser sintering. In terms of the prior art related to the field of selective laser melting, reference can be made to, for example, DE 199 05 067 A1, DE 101 12 591 A1, WO 98/24574 A, DE 10 2009 038 165 A1, DE 10 2012 221 641 A1 and EP 20 52 845 A2.

It is known that the selective laser melting method can be used to produce moulded bodies such as machine parts, tools, prosthetics, jewelry, etc. by building up layers of metal or ceramic powder material according to geometric data describing the corresponding moulded bodies, a plurality of powder layers being successively applied one on top of the other during a production process and each powder layer being heated in a predetermined region, corresponding to a selected cross-sectional region of the moulded body model, using a normally focused laser beam before the next powder layer is applied, such that the powder material is re-melted in the irradiated regions to form coherently hardened portions. In the process, the laser beam is guided over the powder layer in question according to the geometric data describing the selected cross-sectional region of the moulded body or possibly according to data derived therefrom. In selective laser melting, the powder material is normally applied as a binder-free and flux-free metal, ceramic or metal-ceramic mix powder material and heated to fusion point by the laser beam, the energy of the laser beam being selected such that the powder material is melted as completely as possible over its entire layer thickness at the point at which the laser beam impinges thereon. The atmosphere over the region where the laser beam and the powder material interact is usually maintained as an inert gas atmosphere, for example an argon atmosphere.

A device of the type mentioned at the outset is known, for example, from EP 2 052 845 A2. This known device is a forming device that operates according to the principle of selective laser melting. It comprises a powder recovery apparatus or powder recycling apparatus for recycling unused, excess powder material from the process chamber. The powder recycling apparatus comprises a powder removal apparatus for removing powder from the process chamber and a powder collection apparatus for collecting the powder removed from the process chamber, the powder recycling apparatus being designed and connected to the process chamber such that the powder can be recycled in an inert gas atmosphere in a region that is closed off from the outside. The powder removal apparatus in the known forming device comprises a powder suction apparatus having a suction nozzle that protrudes into the process chamber and the suction opening of which can be guided to various points within the process chamber. The powder recycling apparatus comprises a sieve device, by means of which coarse components can be trapped from the unused, excess powder material from earlier forming processes of the forming device, the sieved, relatively fine powder entering a bottle-shaped collection container that can be separated from the sieve device and connected to a powder inlet interface of the process chamber. In the known forming device, the powder inlet interface is located on top of the process chamber housing. From here, powder material can be introduced into a supply cartridge of a powder layer preparation apparatus in the process chamber.

The principle known from EP 20 52 845 A2 of introducing the fresh supply of powder material to be processed into powder reservoir vessels of the layer preparation apparatus by means of an upper process chamber interface was not included in a forming device known from DE 10 2012 221 641 A1. Said forming device is equipped with a powder delivery apparatus in which a powder inlet having its inlet opening in the floor of the process chamber is provided. A powder feed apparatus in this known powder delivery apparatus comprises a delivery duct that connects the powder inlet to the powder material store and has a powder screw conveyor arranged lengthwise therein for delivering powder material to the powder inlet of the process chamber. A similar approach is also taken in the forming device according to DE 10 2009 038 165 A1.

The aforementioned forming devices according to the prior art have generally proven reliable in their task of producing various moulded bodies.

The possibility of producing a moulded body from a plurality of powder materials is already mentioned in EP 20 52 845 A2, for example. There is certainly demand for moulded bodies of this kind comprising regions made of different materials, whether it be different metals or alternating regions of metal and ceramic, etc. Moulded bodies of this kind can, for example, be items of jewelry, denture elements, ultra-fine filter systems, etc. In these cases, it is normally a requirement that the materials of the various regions do not mix. This means that, once a first region has been produced, the previous powder material has to be removed from the entire powder-carrying system of the forming device until it is possible to use the different powder material for the next region of the moulded body within the forming process. This approach is difficult in forming devices having integrated powder recovery apparatuses since it is generally difficult and time-consuming to clean the powder used previously for the construction process out of the various powder recovery apparatus components.

The problem addressed by the invention is that of providing a forming device of the type mentioned at the outset that makes it relatively simple to change powder during a construction process in such a way that strict requirements on material purity of the powder in question can be met.

To solve this problem, a forming device of the type mentioned at the outset is provided according to the invention, characterised in that the powder supply apparatus and the powder recovery apparatus are combined to form a subassembly that is designed as an interchangeable module and comprises connection interfaces, specifically at least one input interface and at least one output interface, that are connection-compatible with relevant connection interfaces of the powder inlet and powder outlet of the process chamber such that excess powder can be fed out of the process chamber through the powder outlet thereof to the powder recovery apparatus by means of the at least one input interface, and such that powder material prepared by the powder recovery apparatus can be fed to the process chamber through the powder inlet thereof by means of the at least one output interface.

The interchangeable module can be separate from the forming device, and can be replaced by a similar interchangeable module prepared, for example, for handling a powder material that is different from the powder material of the detached interchangeable module, for example in terms of material and/or particle size distribution. Before changing the interchangeable modules, care should be taken to ensure that all the powder material in the process chamber is removed from the process chamber, in particular that all of it is brought to the interchangeable module, such that powder material residue from the previous forming steps can no longer lead to impurities once the subsequent interchangeable module is connected. Powder material can usually be removed from the process chamber in a relatively simple manner since the process room typically has a clear geometry, and so every point of the process chamber can be reached by a powder suction apparatus, for example a powder suction hose.

According to the concept of the present invention, the generally relatively complex and convoluted geometry of the powder supply apparatus and powder recovery apparatus does not cause any problems in this respect since these components are integrated in the interchangeable module and each interchangeable module can be operated always using the same powder material, so there is no need for any complex cleaning procedures in the interchangeable modules.

According to a particularly preferred embodiment of the invention, each interchangeable module can be moved out of a separation position, in which it is separate from the forming device, into a defined connection position, in which it is integrated in the forming device such that the associated connection interfaces are or can be connected to one another. According to a particularly preferred variant, the arrangement can be assembled such that all associated connection interfaces are automatically properly connected to one another when the interchangeable module changes from the separation position into the connection position. In the process, the connection interfaces are interconnected such that they provide a transition between the interchangeable module and the process chamber that is well sealed with respect to the outside for the necessary powder movement. Within the context of the invention, the notion of the connection being automatically properly established when the interchangeable module changes into the connection position can also be carried over to the connection of other supply lines, for example to the proper connection of power supply interfaces, data transmission interfaces, inert gas pipe interfaces and water pipe interfaces, etc.

The powder recovery apparatus in the interchangeable module preferably comprises a sieve device, for example an ultrasonic sieve device, in particular for trapping coarse components from excess powder material from the process chamber. Such coarse components can be produced during a construction process for example when splashes of molten material hit the powder bed, where they cause a plurality of powder particles to agglomerate and form said coarse components. If this takes place in regions of the powder bed that do not become regions of the moulded body and thus contain excess powder material, the relevant coarse components eventually enter the powder recovery apparatus or sieve device, where they are separated out.

When the interchangeable module is in the connection position, the output of the sieve device is connected to the output interface such that sieved powder material can be fed to the powder inlet of the process chamber through the output interface as powder material to be processed. Expediently, and according to a development of the invention, a buffer container for sieved powder material is provided between the sieve device and the output interface, so there is always a sufficient supply in the process chamber for each powder layer preparation. It is proposed in particular that delivery means for delivering sieved powder to the powder inlet of the process chamber are connected downstream of the sieve device, delivery means of this kind being able to be part of the interchangeable module and/or part of the forming device in general. In particular when these delivery means are a screw conveyor apparatus, said apparatus can penetrate both the output interface of the interchangeable module and the connection interface that is assigned to the process chamber and connected to the output interface when the interchangeable module is in the connection position. The screw conveyor preferably remains on the interchangeable module when the interchangeable module is separated from the forming device.

A particle size measurement apparatus, preferably an optical particle size measurement apparatus, of which the measurement results are used in particular for automatically detecting the particle size distribution of the sieved powder, can be connected downstream of the sieve device, for example. If the particle size distribution changes significantly, the machine controller can, for example, emit an alarm signal that requests powder of a relevant particle size to be introduced into the process such that the desired particle size distribution of the powder being fed into the process chamber is at least approximately achieved again. In this respect, reference is made to WO 2014/167100 A1, the content of which is intended to be included in the disclosure of this application by reference. The particle size distribution can be balanced in a largely automated manner.

According to a likewise preferred embodiment of the invention, the interchangeable module has a powder collection container, connected downstream of the input interface, for receiving excess powder material from the process chamber and optionally a new powder supply of the same material additionally added. This can be a main tank having a comparably large storage volume in which there should always be sufficient amounts of powder held for a particular construction process.

According to a variant of the last-mentioned embodiment of the invention, when the interchangeable module is in the defined connection position, the powder collection container can be arranged lower than the powder outlet of the process chamber, such that excess powder can exit the powder outlet of the process chamber and enter the powder collection container in a manner assisted by gravity. Preferably, the powder outlet of the process chamber is located in the floor of the process chamber housing, such that the powder collection container is arranged substantially entirely below the process chamber.

According to a development of the embodiment of the invention having a powder collection container, it is proposed that the powder collection container comprises a powder outlet and that a delivery apparatus for delivering powder material from the powder collection container to the sieve device is provided between the powder outlet of the powder collection container and a powder inlet of the sieve device. In this way, sieved powder material can enter the buffer container again and again as necessary during the operation of the forming device in order to be fed to the process chamber from said buffer container.

The delivery apparatus for delivering powder material from the powder collection container to the sieve device can, for example, be a gas flow delivery apparatus, in particular an inert gas flow delivery apparatus having a gas flow circuit, designed to deliver powder particles by means of a gas flow. According to a variant of the invention, a gas flow delivery apparatus of this kind can comprise a separator at its output, preferably a cyclone separator, designed to separate powder particles out of the gas flow and feed them to the sieve device. Alternatively or additionally, the delivery apparatus could also comprise a screw conveyor apparatus or the like.

A likewise preferred embodiment of the invention is characterised in that the powder outlet of the process chamber and/or the powder inlet of the process chamber opens in the floor of the process chamber. This too is a feature that allows powder material to be handled in such a way as to prevent the process chamber being unnecessarily contaminated with powder material at difficult to access points, and so powder can be cleaned out of the process chamber in a comparatively simple manner.

It is also proposed for the interchangeable module to comprise casters and optionally guide rollers and to thus be able to move on the casters in order to be moved into the defined connection position or into the separation position. The interchangeable module can thus be moved in a very simple manner.

In addition, it is proposed that an inert gas delivery apparatus is provided and that all the interchangeable module components through which powder flows can be purged by inert gas, for example argon, by means of the inert gas delivery apparatus such that the components can be operated in an inert gas atmosphere. It is also possible to provide an inert gas system that is designed to purge both the process chamber and the interchangeable module connected thereto in each case, as well as any other components.

Automatic sealing devices that act on the connection interfaces in order to seal the relevant connections with respect to the outside at that point can be provided such that the interchangeable module and the process chamber are sealed with respect to the outside when the interchangeable module is decoupled, and unintentional entry of external air is largely prevented.

Additional developments of the forming device according to the invention are set out in claims 12-16. These developments relate to the presence of a purging apparatus for purging the process chamber using a purging gas during a construction process, all components of the purging apparatus that could potentially collect solid particles, such as process smoke condensate, being housed in an interchangeable module. These components may include a filter arrangement through which purging gas flows, and a gas delivery apparatus generating the purging gas flow. The last-mentioned interchangeable module can be a separate interchangeable module intended solely for this purpose. Preferably, however, it is the interchangeable module that also contains the powder supply apparatus and the powder recovery apparatus. Preferably, the purging apparatus is designed to make the purging gas flow in a purging gas circuit that encompasses the process chamber, the gas delivery apparatus and the filter apparatus in a series arrangement.

Another preferred embodiment of the invention comprises a suction device for sucking away remaining powder material out of the process chamber by means of a gas flow once a construction process is complete or before one begins, a separate delivery pump and a separate powder separator of this suction device optionally also being housed in the interchangeable module.

Therefore, for these developments to the overriding concept of the invention, it is also stated that as many components as possible that could be contaminated with powder material and are difficult to clean are housed in the interchangeable module, such that the components remaining on the forming device in general after the interchangeable module has been removed from the forming device can be quickly cleaned in a simple manner and/or can be exchanged in a simple and quick manner, such as the smoothing slide or components thereof and the suction handling means (suction hose) of the suction device.

This inventive idea can also be developed further by making the process chamber per se interchangeable and, for example, a part of the interchangeable module. In this case, the aforementioned interfaces between the process chamber and the interchangeable module in general could be replaced by unbroken continuous pipes. In this case, it would also be expedient to ensure that the process chamber can be easily separated from adjacent or connected components, such as the irradiation apparatus or the lift drive for the construction platform and/or the drive for the smoothing slide. On the other hand, the smoothing slide and its drive can also remain in the process chamber. Furthermore, it is also conceivable to have a variant in which the lift drive for the construction platform and/or the construction cylinder containing the construction platform are also interchangeable and possibly a component part of the interchangeable module.

Figure 5:
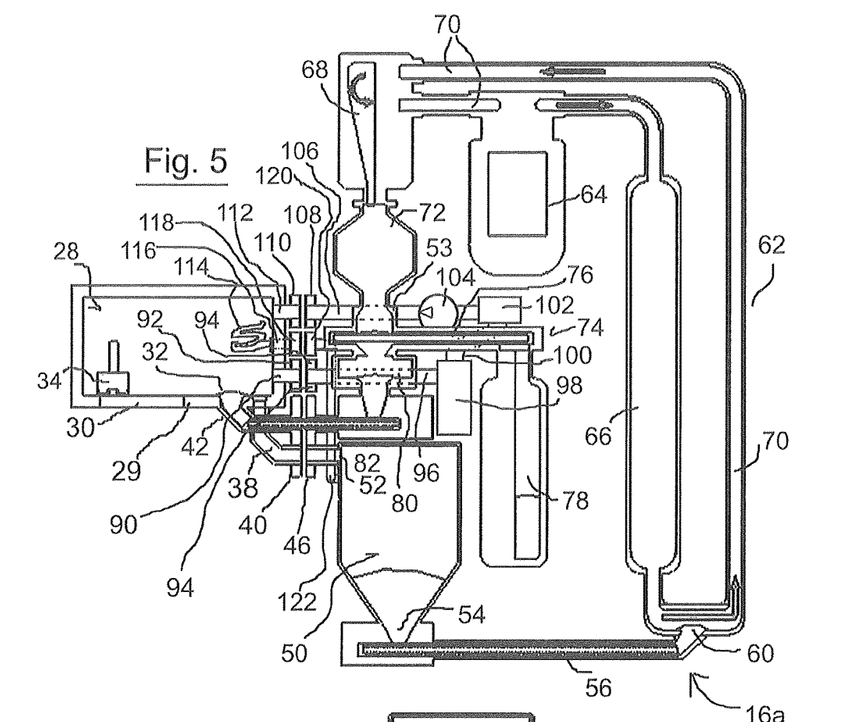
FIG. 5 is a sectional view similar to the sectional view according to FIG. 4 showing the powder-carrying or gas-carrying main components of an additional embodiment of an interchangeable module according to the invention in a position on the process chamber close to the defined connection position.

For example, the components shown schematically in FIG. 5, including the process chamber, could be component parts of an interchangeable module. The applicant reserves the right to file a divisional application to further pursue the aforementioned wider concept of the invention of, inter alia, the process chamber also being interchangeable, and/or to address these notions using claims directed thereto in the present application.

Claim 15 describes another advantageous aspect of the invention, in which the interchangeable module comprises a data processing device that can also communicate with a controller in the forming device in general in order to send messages regarding the status of the interchangeable module to the controller and optionally receive control information therefrom. The controller can then take the information into account when controlling a construction process. The status messages can, for example, be information on the type, volume and/or particle sizes of the powder material powder stored in the interchangeable module.

The invention further relates to an interchangeable module for a forming device according to the invention. This interchangeable module comprises a powder supply apparatus and a powder recovery apparatus of the type described above. In addition, the interchangeable module can also contain some or all the features that were described above as belonging to the interchangeable modules.

The forming device according to the present invention is preferably equipped with a plurality of similar interchangeable modules for different powder materials, these interchangeable modules being able to be integrated in the forming device in a manner interchangeable with one another.

The invention will be described in more detail below with reference to the drawings on the basis of an embodiment.

Figure 1:
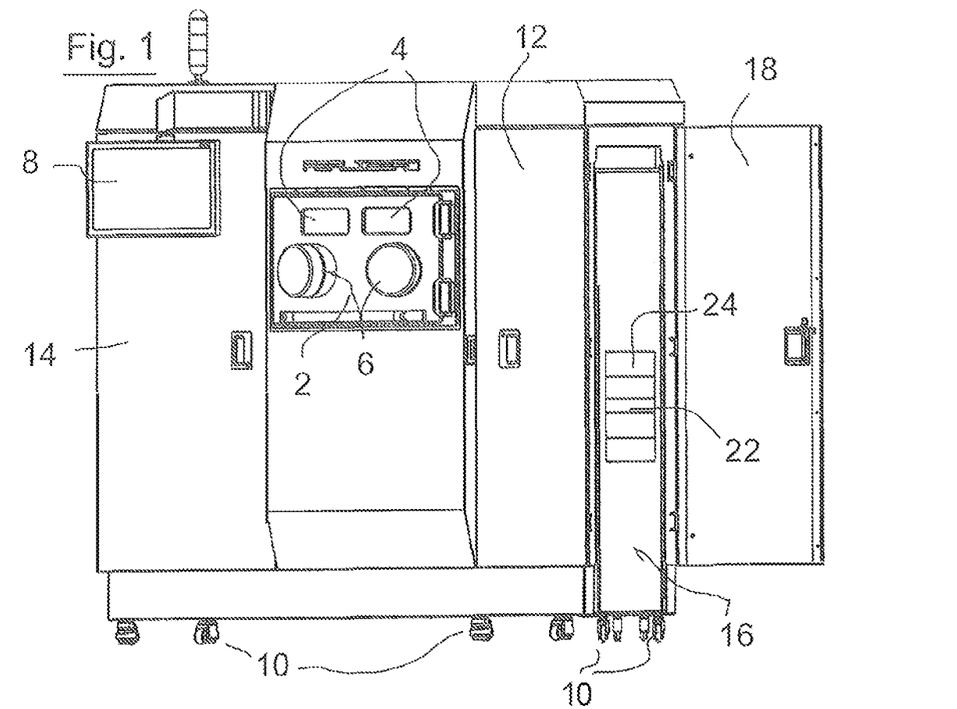
FIG. 1 shows a forming device according to the invention having an interchangeable module in the connection position.
Figure 2:
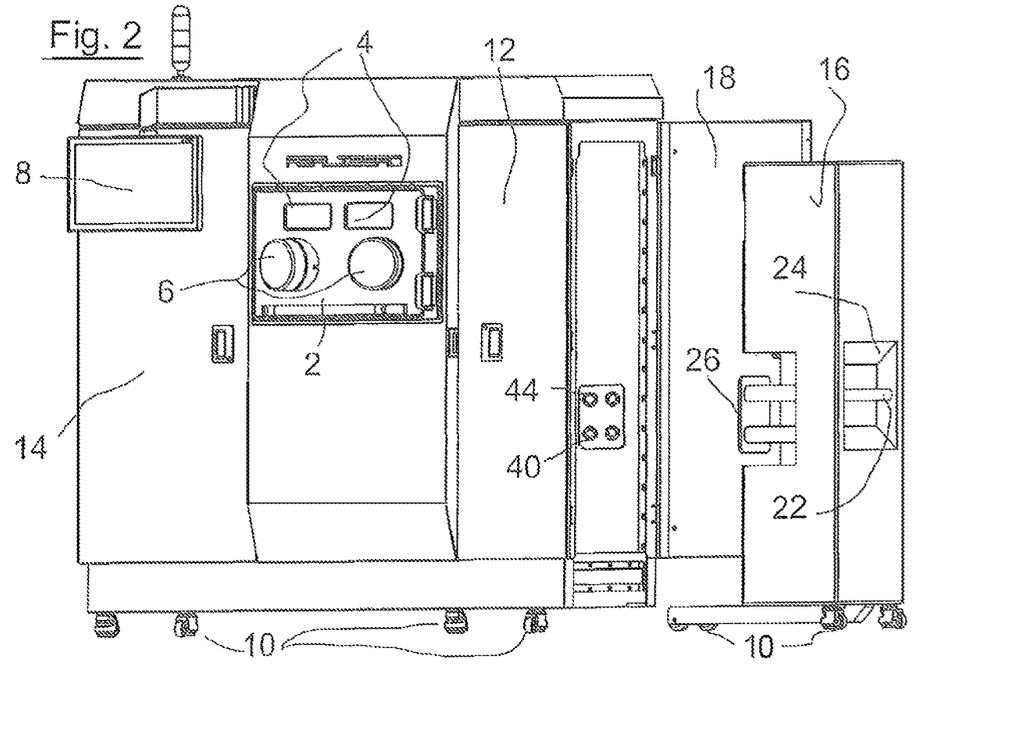
FIG. 2 shows the device from FIG. 1 having an interchangeable module that is in a separation position and is separate from the forming device.

According to FIG. 1 and FIG. 2, the forming device according to the invention comprises a housing for various components, inter alia for a process chamber comprising a front process chamber door 2 in which two observation windows 4 and two feedthroughs 6 are provided, these feedthroughs 6 being sealed with respect to the outside by operating gloves (not shown in the drawings) (glove box principle). After a construction process is complete, the process chamber door 2 can be opened in order to remove from the process chamber the produced moulded body together with a substrate plate on which the moulded body has been constructed.

A flat screen 8 is used to visually display various items of information and optionally also to transmit an image of the inside of the process chamber taken by means of a video camera. The housing of the forming device is mounted on casters 10, and so the forming device is simple to maneuver. Behind the housing doors 12, 14 there are various components of the forming device, such as the process computer, inert gas bottles, power supply components for the laser device for selective laser melting, etc. The housing further contains an irradiation device for selectively re-melting the powder material. The basic approach when constructing a moulded body according to the selective laser melting method can be taken from the prior art documents mentioned at the outset, the content of which in this respect is intended to be included herein by reference.

When constructing a moulded body in layers out of powder material, powder material not located in the region becoming part of the moulded body typically accumulates in each powder layer and therefore remains left over as excess powder material. Moreover, during the preparation of each individual powder layer, excess powder material also accumulates on previously prepared powder layers therebelow or on the base plate and is fed to be recovered in the interchangeable module within the context of the present invention.

In FIG. 1, the interchangeable module 16 is shown in its connection position in the housing of the forming device, the closure door 18 assigned to the storage chamber for the interchangeable module 16 being in the open state.

The interchangeable module 16 is also mounted on casters 10, and so it can be withdrawn out of the defined connection position shown in FIG. 1 and moved into a separation position, as shown for example in FIG. 2, in a simple manner. A handlebar 22 in a recess 24 in the housing of the interchangeable module 16 allows the interchangeable module 16 to be slid into the connection position and the interchangeable module 16 to be withdrawn from the connection position in a simple manner.

Figure 3A:
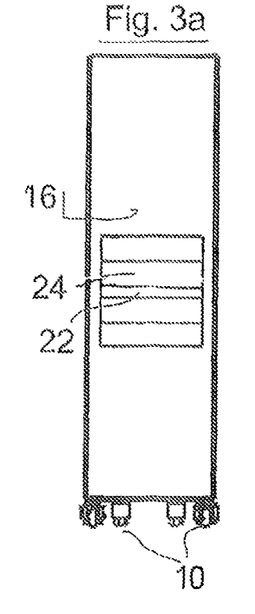
FIG. 3a-3c are a front view, side view and rear view, respectively, of the interchangeable module from FIG. 1 and FIG. 2.
Figure 3B:
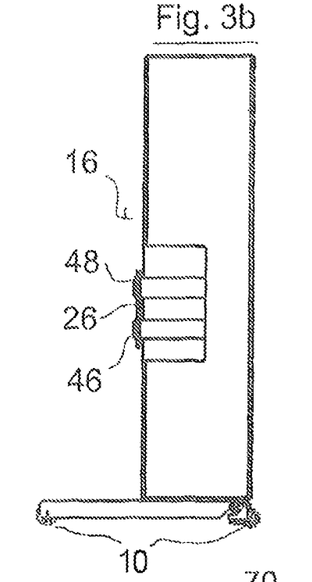
Figure 3C:
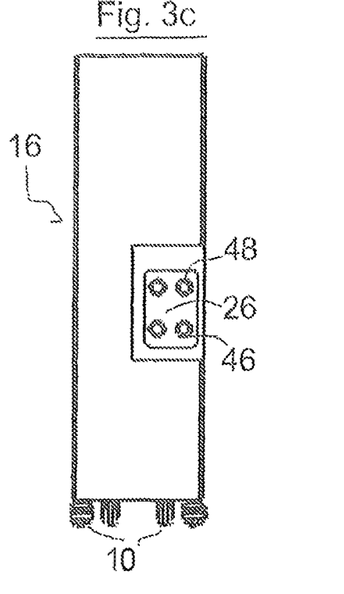

FIG. 2, FIG. 3b and FIG. 3c schematically show a connection interface group at 26. When the interchangeable module 16 is slid into the defined connection position, this connection interface group 26 automatically enters a connection configuration such that the associated connection interfaces of the interchangeable module 16 and the forming device in general are automatically properly connected to one another. Mechanical guides that guide the interchangeable module 16 into the connection position when it is slid into the housing can be provided. Locking means, for example electromagnetic locking means (not shown), are preferably also provided and attract the interchangeable module when it approaches the connection position and hold it in the connection position.

Figure 4:
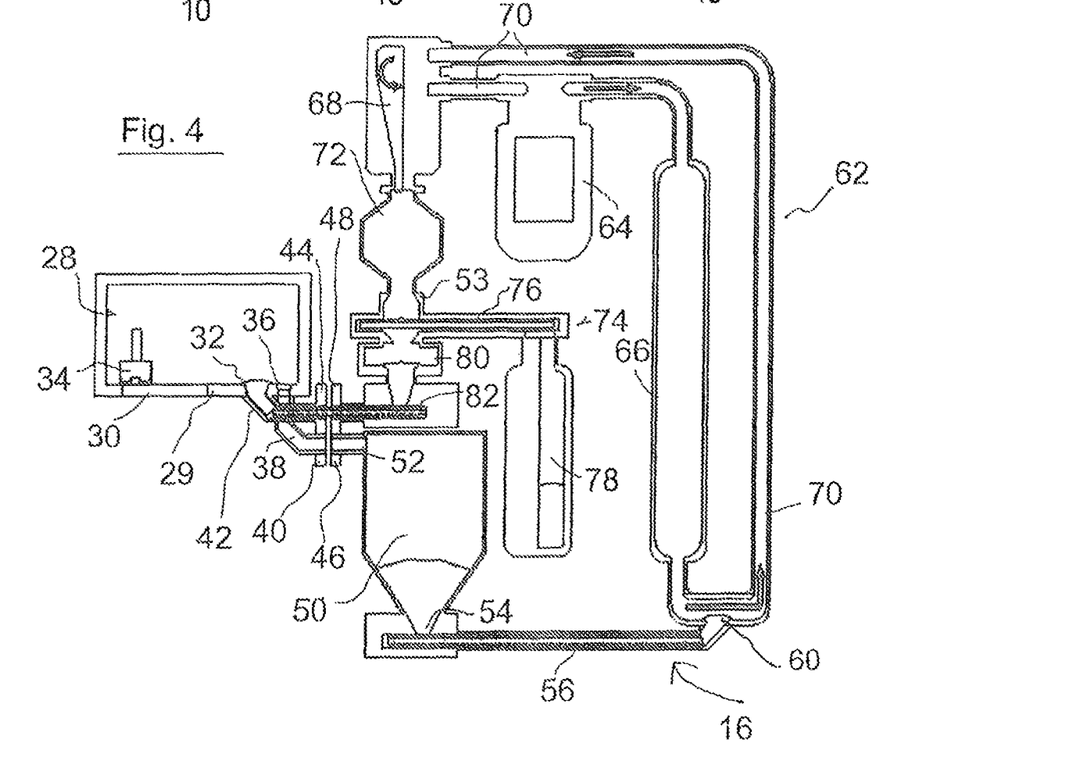
FIG. 4 is a schematic sectional view through the powder-carrying or gas-carrying main components of the interchangeable module in a position on a process chamber close to the defined connection position.

FIG. 4 shows the substantially internal gas-carrying or powder-carrying components of the interchangeable module 16 relative to the forming device in general in a position close to the defined connection position of the interchangeable module 16, the forming device in general being shown in FIG. 4 by the schematically illustrated process chamber since the additional components of the forming device, such as the irradiation apparatus, etc., do not play any role in the explanation of the present invention.

The process chamber 28 contains a construction platform 30 that can be lowered in steps within a construction cylinder or the like in a manner known per se and on which a moulded body is gradually constructed from powder material layers by selectively irradiating each layer. Each powder layer is re-melted in the regions that correspond to the cross-sectional regions of the moulded body that are assigned to each layer. To prepare a powder material layer to be irradiated next, powder material is fed to the process chamber 28 through a powder inlet 32 in the floor of the process chamber. According to FIG. 4, a smoothing slide shown at 34 in FIG. 4 can be moved back and forth from left to right and right to left in order to carry along powder material introduced into the process chamber 28 at the powder inlet 32 and to smooth above the construction platform 30 or smooth an already irradiated powder layer left behind from a previous powder preparation step, such that a new powder layer for the next irradiation and re-melting process is prepared in this manner. The smoothing slide 34 can be raised in a controlled manner shortly before reaching the powder inlet 32, at least when it moves to the right in FIG. 4, and can be lowered again after sweeping over the powder inlet 32, such that, when it moves to the left in FIG. 4, it can carry with it an amount of powder material projecting upwards from the process chamber floor 29 in order to prepare the next powder layer therewith. Excess powder material accumulating in the process can be caught and swept away again accordingly by the smoothing slide 34 when it moves to the right, such that said excess powder can enter the preferably slot-like powder outlet 36 that is also provided in the process chamber floor 29. The smoothing slide 34 or at least elements of the smoothing slide 34 that come into contact with powder material or to which powder tends to adhere can preferably be exchanged in a simple manner.

The powder outlet 36 is connected to a connection interface 40 by means of a connection pipe piece 38. The powder inlet 32 is connected to a connection interface 44 by means of a connection pipe portion 42. As can be seen in FIG. 4, the connection interface 40 assigned to the powder outlet 36 can be connected to an input interface 46 of the interchangeable module 16, whereas the connection interface 44 assigned to the powder inlet 32 can be simultaneously connected to an output interface 48 when the interchangeable module 16 is moved into the defined connection position. FIG. 4 shows a state shortly before the connection position is reached.

A collection container 50 is connected in the interchangeable module 16 at the input interface 46 and forms a main tank having a relatively large storage volume for powder material. The input 52 of the collection container 50, which input is connected downstream of the input interface 46, is located at the highest point of said container, whereas an output 54 is located at the lowest point of the collection container 50, and specifically in a region of the collection container 50 that tapers conically downwards. The output 54 of the collection container 50 opens into a screw conveyor apparatus 56, which transports powder leaving the collection container 50 at the outlet 54 thereof towards the right in FIG. 4 to a powder feed 60 of a gas flow delivery apparatus 62.

The gas flow delivery apparatus 62 comprises a gas circuit having a pump 64 delivering the gas flow, a buffer 66 connected downstream of the pump 64, and a cyclone separator 68. Said components of the gas flow delivery apparatus are interconnected by gas flow pipe elements 70 to form a circuit.

When the gas flow delivery apparatus 62 is in delivery mode, the gas flow indicated by arrows entrains the powder material present at the powder feed 60 and conducts it to the cyclone separator 68 to be separated out of the gas flow. The pump 64 ensures the gas flow is maintained.

By means of an intermediate tank 72, the powder material separated out by the cyclone separator 68 reaches a powder recovery apparatus 74 via a powder inlet 53 in the form of an ultrasonic sieve device 76, in which the coarse components of the powder material fed in are trapped and conveyed into a container 78. The powder collected in the container 78 in its coarse particle form is not normally used any further for forming in the forming device.

The finer powder that passes through the sieve device 76 enters an intermediate tank 80, from which it is fed to a screw conveyor apparatus 82 that feeds the powder material recycled by the sieving process to the powder inlet 32 of the process chamber.

The drawings do not show automatic sealing means that preferably automatically seal the interfaces 40, 44, 46, 48 with respect to the outside as soon as the interchangeable module 16 is moved out of the defined connection position. In the gas delivery apparatus 62, inert gas, in particular argon, is preferably circulated by means of the pump 64.

Next, reference will be made to another embodiment of the invention shown in FIGS. 5 and 6. This further embodiment of the invention comprises all the features of the first embodiment of the invention as already explained with reference to FIGS. 1-4, the same reference numerals being used in the drawings to denote said features. Therefore, reference can be made to the above description of the first embodiment for explanations of said features present in the two embodiments. In the following, the features of the second embodiment not present in the first embodiment will be described with reference to FIGS. 5 and 6.

One essential aspect of the invention in one design, which also represents the second embodiment, is to preferably arrange within a common interchangeable module all the filter components, pump components and powder collection or storage containers that are contaminated by powder material in relation to a construction process for producing a moulded body, such that, once a construction process is complete, substantially all the powder material is left in the interchangeable module and can be removed from the forming device in general together with the interchangeable module. The aim of this is to ensure that the forming device in general and in particular the process chamber and the pipes that lead from the process chamber to the connection interfaces for the relevant interchangeable module and possibly come into contact with powder particles in connection with the production of a moulded body can be cleaned in a simple and quick manner as required and can thus be prepared for a subsequent construction process for producing a moulded body out of a potentially different powder material. In that case, a different interchangeable module containing the relevant other powder material could be used in the forming device without much delay.

The process chamber 28 is designed so as to be continuously purged by an inert gas, for example argon. during a construction process and so as to be integrated in an inert gas circuit for this purpose. The components of this inert gas circuit include a pipe part 90 that leads out of the process chamber 28 and has an outer connection interface 92 for a connection interface 94, which is connection-compatible therewith, of the interchangeable module 16a. In relation to the interchangeable module 16a, the connection interface 94 is an input interface from which a first pipe part 96 leads to a pre-filter 98 for removing coarse contaminant particles, such as powder particles, condensate agglomerates, dust particles or the like, from inert gas sucked out of the process chamber 28. At its output, the pre-filter 98 is connected by means of a pipe 100 to a fine filter, for example HEPA filter, that is used to filter ultra-fine particles that have passed through the pre-filter out of the inert gas circuit. At its output, the fine filter is connected to a gas delivery pump 104, which is used to maintain the gas flow in the inert gas circuit. By means of a pipe 106, the pump 104 is connected to an output interface 108 that is connection-compatible with a gas inlet interface 110 for the inert gas feed to the process chamber 28. A pipe part 112 connects the interface 110 to the interior of the process chamber 28. The associated connection interfaces 92, 94 and 108, 110 are also automatically properly interconnected such as to be sealed with respect to the outside as soon as the interchangeable module engages into its defined connection position in the forming device.

In preparation for a construction process, the process chamber (once its process chamber door is closed) and the additional components 90 to 112 of the inert gas circuit can then first be evacuated. For this purpose, the pump 104 can be used as an evacuating pump, for which care must then be taken to ensure that the delivered air is channeled to the exterior by adjusting a valve arrangement (not shown) at the pump output. If the inert gas circuit has been sufficiently evacuated, a supply of inert gas can first be introduced into the inert gas circuit from an inert gas source (e.g. a pressure cylinder) by altering the valve settings, the inert gas ultimately being able to be recirculated in the inert gas circuit by means of the pump 104 once the valve arrangement has been adjusted accordingly. The inert gas is recirculated in the inert gas circuit while a construction process is underway. In this construction process, process smoke can be produced and can condense and leave behind solid particles that are entrained in the inert gas flow. Powder particles that are potentially swirled up can also enter the inert gas circuit and likewise contaminate the inert gas. As mentioned, the filters 98, 102 are used to filter impurities of this type out of the inert gas, such that the cleaned inert gas can ultimately be returned to the process chamber 28 again.

In FIG. 5, 114 denotes a flexible hose of a powder suction device, which hose is provided in the process chamber 28 in order to suck powder material out of the process chamber using an inert gas flow in particular after a moulded body has been completed. In this case, this powder can be excess powder surrounding the produced moulded body on the construction platform or other powder material remaining in the process chamber 28 or in the connection line parts 38 or 42. The suction hose can be guided manually by an operator even when the process chamber door 2 is closed. To do so, the operator can reach through the glove operation openings 6 (cf. FIGS. 1 and 2) into the gloves sealed thereon and thus grip and move the suction hose 114. The suction hose 114 is connected by means of a connection line part 116 to an outer output interface 118, which in turn is connection-compatible with a complementary interface 120 on the interchangeable module 16a. The interface 120 on the interchangeable module 16a is connected, by means of a pipe 122 in the interchangeable module 16a, to a pump (located in the background and not visible in FIG. 5) for maintaining the inert gas flow, upstream of which pump a powder separator is connected, preferably a cyclone separator (also not visible in FIG. 5). The powder separated out of the inert gas flow by the powder separator enters the main tank 50 and can thus be used in a construction process for a subsequent moulded body. The inert gas is returned to the process chamber 28 by means of corresponding pipes having relevant connection interfaces 121. The pump connected to the suction hose 14, and the downstream separator can be designed in the same way as the pump 64 and the separator 68. The suction hose 114 can be exchanged quickly and simply. According to a variant of the powder suction device, the powder suction hose can be arranged on the accordingly designed pipe 122 as an extensible or fold-back hose in such a way that it is also a component of the interchangeable module 16a and can be inserted into the process chamber 28 or removed therefrom through the interface 118, preferably in a manner sealed with respect the outside. In this case, the powder suction hose remains on the interchangeable module when the module is removed from its connection position. The basic design and functioning of a powder suction apparatus are known, for example from the aforementioned EP 2 052 845 A2.

In the embodiment according to FIG. 5, all the components of the powder suction device that critically have to have powder cleaned out of them are provided in the interchangeable module 16a such that, following a sufficiently thorough powder suction process using the powder suction hose 114, substantially all the powder is in the interchangeable module 16a in this respect too. All the elements of the forming device in general that come into contact with powder, in particular the process chamber 28, are then very simple to clean in a quick and thorough manner, and are thus ready for a subsequent construction process possibly using a different powder material and interchangeable module.

Figure 6:
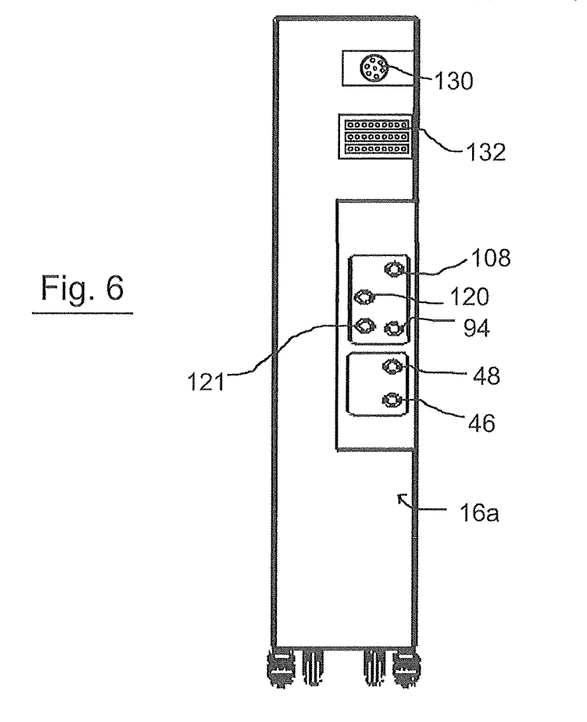
FIG. 6 is a view from behind, similar to the view according to FIG. 3c, of an interchangeable module that can contain the components shown in FIG. 5.

FIG. 6 also shows a power supply interface 130 and a data line interface 132 on the interchangeable module 16a, which, by means of an accordingly connection-compatible power supply interface and data line interface of the forming device in general, also automatically enter the proper connection configuration when the interchangeable module 16a enters its defined connection position in the forming device. By means of the power supply interface 130 and lines connected thereto, the electrical consumers of the interchangeable module 16a, such as pumps, screw conveyors, sieve apparatuses, etc., are supplied with electrical power.

The data line interface 132 is connected to an electronic data processing apparatus in the interchangeable module 16a, in which apparatus characteristic data of the interchangeable module and optionally other items of information are stored.

On the forming device, a data line interface is provided that is connection-compatible with the data line interface 132 and is connected to a controller of the forming device by means of relevant data transmission lines. After a data transmission connection has been produced between these data line interfaces, the controller of the forming device can read data from the data processing apparatus of the interchangeable module 16a and prepare itself for particular characteristics that must be taken into account for operation using the relevant interchangeable module 16a. These particular characteristics can in particular relate to the construction process control on the basis of the powder material stored in the interchangeable module, etc.

According to an alternative embodiment, the data can be transmitted between the data processing apparatus of the interchangeable module and the controller of the forming device wirelessly, such as by radio or modulated IR radiation or the like.

An air lock can optionally be provided on the process chamber to allow objects to be placed in the process chamber or removed therefrom without destroying the inert gas atmosphere in the process chamber.

The invention claimed is:

1. A forming device for producing moulded bodies by selectively hardening powder material to form connected regions, the forming device comprising:
   a process chamber having a powder inlet through which powder material is provided into the process chamber for processing, a powder outlet through which excess powder material resulting from the processing is output from the process chamber, a gas inlet through which purging gas is fed into to the process chamber, and a gas outlet through which the purging gas is evacuated from the process chamber;
   a subassembly, designed as an interchangeable module of the forming device, comprising (i) a powder supply apparatus configured to be connected to the powder inlet for providing the powder material into the process chamber, (ii) a powder recovery apparatus configured to be connected to the powder outlet for processing and recycling the excess powder material output from the process chamber, and (iii) a purging apparatus for purging the process chamber using a purging gas, wherein the interchangeable module comprises:
     a first input interface that is connection-compatible with a powder outlet interface of the powder outlet, such that the excess powder material can be output from the process chamber through the powder outlet to the powder recovery apparatus by way of the first input interface,
     a first output interface that is connection-compatible with a powder inlet interface of the powder inlet, such that powder material recycled by the powder recovery apparatus can be provided to the process chamber through the powder inlet by way of the first output interface,
     a second output interface that is connection-compatible with a gas inlet interface, such that the purging gas can be fed into the process chamber through the gas inlet from a gas delivery system of the purging apparatus, by way of the second output interface, and
     a second input interface that is connection-compatible with a gas outlet interface, such that the purging gas can be evacuated from the process chamber through the gas outlet to a filter arrangement of the purging apparatus, by way of the second output interface; and wherein the powder supply apparatus comprises a screw conveyor apparatus that is positioned such that the screw conveyor apparatus penetrates the first output interface and the interchangeable module when the interchangeable module is connected with the forming device, and wherein the screw conveyer apparatus remains attached to the interchangeable module when the interchangeable module is separated from the forming device.

2. The forming device according to claim 1, wherein the interchangeable module can be moved out of a separation position into a defined connection position, the interchangeable module being integrated in the forming device when in the defined connection position such that (i) the first input interface is connected to the powder outlet interface, (ii) the first output interface is connected to the powder inlet interface, (iii) the second output interface is connected to the gas inlet interface, and (iv) the second input interface that is connected to the gas outlet interface.

3. The forming device according to claim 2, wherein the first input interface, the first output interface, the second output interface, and the second input interface of the interchangeable module are arranged such that all associated connections to the powder outlet interface, the powder inlet interface, the gas inlet interface, and the gas outlet interface are automatically properly secured when the interchangeable module is moved out of the separation position into the defined connection position.

4. The forming device according claim 1, wherein the powder recovery apparatus in the interchangeable module comprises a sieve device for trapping coarse components from the excess powder material, and wherein an output of the sieve device is configured to be connected to the powder outlet interface, such that sieved powder material can be supplied to the powder inlet of the process chamber through the powder outlet interface as the powder material to be processed.

5. The forming device according to claim 4, wherein a delivery means for delivering sieved powder to the powder inlet of the process chamber is connected downstream of the sieve device.

6. The forming device according claim 4, wherein the sieve device comprises an ultrasonic sieve device that can be made to vibrate by means of ultrasound.

7. The forming device according to claim 1, wherein the interchangeable module comprises a powder collection container that is connected downstream of the first input interface and is configured for receiving the excess powder material from the process chamber.

8. The forming device according to claim 7, wherein a delivery apparatus for delivering the powder material from the powder collection container to the powder recovery apparatus is provided between an additional powder outlet of the powder collection container and an additional powder inlet of the powder recovery apparatus.

9. The forming device according to claim 8, wherein the delivery apparatus for delivering the powder material from the powder collection container to the powder recovery apparatus comprises a gas flow delivery apparatus, the gas flow delivery apparatus comprising a separator designed to separate powder particles out of a gas flow and feed them to the powder recovery apparatus.

10. The forming device according to claim 9, wherein the delivery apparatus for delivering the powder material from the powder collection container to the powder recovery apparatus comprises an inert gas flow delivery apparatus.

11. The forming device according to claim 9, wherein the gas flow delivery apparatus comprises the separator.

12. The forming device according to claim 9, wherein the separator comprises a cyclone separator.

13. The forming device according to claim 1, wherein at least one of the powder outlet of the process chamber or the powder inlet of the process chamber open in a floor of the process chamber.

14. The forming device according to claim 1, wherein the purging gas is argon.

15. The forming device according to claim 1, wherein a plurality of similar interchangeable modules are available for different powder materials, the plurality of similar interchangeable modules configured to be combined with the forming device in a defined connection position interchangeably with one another.

16. The forming device according to claim 1, wherein the purging apparatus is designed to make the purging gas flow in a purging gas circuit, which encompasses the process chamber, when the interchangeable module is in a defined connection position such that, when the purging apparatus is in purging operation, the gas delivery system of the purging apparatus can circulate the purging gas in the purging gas circuit such that the purging gas flows through the filter arrangement in order to have impurities removed.

17. The forming device according to claim 1, further comprising a suction device for sucking the excess powder material out of the process chamber by means of a gas flow once a construction process is complete or before one begins, the suction device comprising a suction handling means that can be inserted into the process chamber, a delivery pump connected to said suction handling means for generating the gas flow, and a separator for separating the excess powder material out of the gas flow, the delivery pump and the separator being housed in the interchangeable module, the separator being designed to supply the powder material separated out of the gas flow to the powder recovery apparatus.

18. The forming device according to claim 17, wherein the suction device comprises a flexible hose.

19. The forming device according to claim 1, wherein the interchangeable module contains a data processing apparatus in which data of the interchangeable module are stored, and wherein the forming device further comprises a controller that can be connected to the data processing apparatus of the interchangeable module for data transmission in order to read the data from said data processing.

20. The forming device according to claim 19, wherein the data comprises at least one of a type or a volume of powder material stored in the interchangeable module.

\* \* \* \* \*